United States Patent
Khan

(10) Patent No.: US 8,780,586 B2
(45) Date of Patent: *Jul. 15, 2014

(54) DEVICES AND METHODS FOR CONVERTING ALTERNATING CURRENT (AC) POWER TO DIRECT CURRENT (DC) POWER

(71) Applicant: Itron, Inc., Liberty Lake, WA (US)

(72) Inventor: Zafarullah Khan, Kenner, LA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,002

(22) Filed: Dec. 28, 2012

(65) Prior Publication Data

US 2013/0188398 A1 Jul. 25, 2013

Related U.S. Application Data

(63) Continuation of application No. 12/270,985, filed on Nov. 14, 2008, now Pat. No. 8,451,627.

(60) Provisional application No. 60/988,565, filed on Nov. 16, 2007.

(51) Int. Cl.
 *H02M 7/217* (2006.01)

(52) U.S. Cl.
 USPC .......................................................... 363/20

(58) Field of Classification Search
 USPC ............. 363/20, 120–127; 323/266–282, 284
 See application file for complete search history.

(56) References Cited

U.S. PATENT DOCUMENTS

| | | | |
|---|---|---|---|
| 3,649,906 A | 3/1972 | Carpentier et al. | |
| 3,947,747 A | 3/1976 | Smith | |
| 4,074,345 A | 2/1978 | Ackermann | |
| 4,922,404 A | 5/1990 | Ludwig et al. | |
| 4,975,823 A | 12/1990 | Rilly et al. | |
| 5,179,512 A | 1/1993 | Fisher et al. | |
| 5,430,637 A | 7/1995 | Buck | |
| 5,457,462 A | 10/1995 | Mitsumoto et al. | |
| 5,485,077 A | 1/1996 | Werrbach | |

(Continued)

OTHER PUBLICATIONS

Liebert Corporation, Nov. 2004.*

(Continued)

*Primary Examiner* — Adolf Berhane
*Assistant Examiner* — Yemane Mehari
(74) *Attorney, Agent, or Firm* — Hanley, Flight & Zimmerman, LLC

(57) ABSTRACT

Methods, circuit designs, systems, and devices for the conversion of high voltage alternating current (AC) to low voltage, high current direct current (DC) are described. An exemplary apparatus includes a rectifier for receiving a high voltage AC line power input and for outputting a full wave, high voltage DC, a gating component coupled to the rectifier for receiving the high voltage DC output by the rectifier, wherein the gating component is configured to gate the high voltage DC by turning on at a zero crossing level and turning off when the high voltage DC exceeds a preset voltage threshold and wherein the output of the gating component is an intermediate voltage DC capped by the preset voltage threshold, and a DC-DC converter coupled to the gating component for receiving the intermediate voltage DC output by the gating component, wherein the DC-DC converter is configured to step down and smooth out the intermediate voltage DC to a desired high current, low voltage DC output.

28 Claims, 12 Drawing Sheets

(56) References Cited

U.S. PATENT DOCUMENTS

| | | | |
|---|---|---|---|
| 5,764,496 A * | 6/1998 | Sato et al. | 363/37 |
| 6,069,391 A | 5/2000 | Yuzuriha | |
| 6,069,804 A | 5/2000 | Ingman et al. | |
| 6,169,391 B1 * | 1/2001 | Lei | 323/266 |
| 6,275,018 B1 | 8/2001 | Telefus et al. | |
| 6,469,920 B2 | 10/2002 | Butler et al. | |
| 6,597,159 B2 | 7/2003 | Yang | |
| 6,788,039 B2 | 9/2004 | Abdoulin | |
| 7,002,815 B2 | 2/2006 | Scarlatescu | |
| 7,123,491 B1 | 10/2006 | Kusumi | |
| 7,183,670 B2 | 2/2007 | To | |
| 7,199,560 B2 | 4/2007 | Cheung et al. | |
| 7,215,105 B2 | 5/2007 | Balakrishnan et al. | |
| 7,330,364 B2 | 2/2008 | Lynch | |
| 7,489,120 B2 * | 2/2009 | Matthews | 323/284 |
| 7,598,703 B2 | 10/2009 | Zhang et al. | |
| 7,859,864 B2 | 12/2010 | Shiroyama | |
| 8,049,470 B2 | 11/2011 | Khan | |
| 2005/0057951 A1 | 3/2005 | Berghegger | |
| 2005/0088858 A1 | 4/2005 | Kogel et al. | |
| 2005/0146308 A1 | 7/2005 | Quazi et al. | |
| 2006/0097705 A1 | 5/2006 | Cheung | |
| 2006/0208969 A1 | 9/2006 | Berghegger | |
| 2006/0215423 A1 | 9/2006 | Schonleitner et al. | |
| 2006/0220623 A1 | 10/2006 | Andruzzi et al. | |
| 2006/0255776 A1 | 11/2006 | Fishbein et al. | |
| 2007/0182338 A1 * | 8/2007 | Shteynberg et al. | 315/200 R |
| 2007/0223255 A1 | 9/2007 | Condemine et al. | |
| 2009/0129133 A1 | 5/2009 | Khan | |
| 2009/0207602 A1 * | 8/2009 | Reed et al. | 362/225 |
| 2011/0248685 A1 | 10/2011 | Khan | |

OTHER PUBLICATIONS

Biometra, Gottingen, Oct. 1, 2004.*

Biometra reference, Oct. 1, 2004.

Liebert Corporation reference, Nov. 2004.

Datasheet, Adjustable Off-Line Inductorless Switching Regulator SR-86, Supertex, Inc., (date unknown), pp. 1-8, www.supertex.com, Sunnyvale, California US.

Datasheet, Preliminary Specification, KT-5260F, 5W Wide Input Range DC/DC Converter, (date unknown), Central Technologies, Irvine, California US.

Simpson, Chester, Linear and Switching Voltage Regulator Fundamentals, National Semiconductor, (date unknown), pp. 1-62, www.national.com/assets/en/appnotes/f4.pdf and www.national.com/assets/en/appnotes/f5.pdf.

United States Patent and Trademark Office, "Non-Final Office Action," issued in connection with U.S. Appl. No. 12/270,985, Feb. 16, 2011, 57 pages.

United States Patent and Trademark Office, "Final Office Action," issued in connection with U.S. Appl. No. 12/270,985, Nov. 1, 2011, 31 pages.

United States Patent and Trademark Office, "Non-Final Office Action," issued in connection with U.S. Appl. No. 12/270,985, Mar. 29, 2012, 28 pages.

United States Patent and Trademark Office, "Non-Final Office Action," issued in connection with U.S. Appl. No. 12/270,985, Sep. 10, 2012, 38 pages.

United States Patent and Trademark Office, "Notice of Allowance," issued in connection with U.S. Appl. No. 12/270,985, Jan. 24, 2013, 29 pages.

United States Patent and Trademark Office, "Non-Final Office Action," issued in connection with U.S. Appl. No. 13/074,890, Apr. 1, 2013, 16 pages.

United States Patent and Trademark Office, "Notice of Allowance," issued in connection with U.S. Appl. No. 13/074,890, Nov. 18, 2013, 18 pages.

* cited by examiner

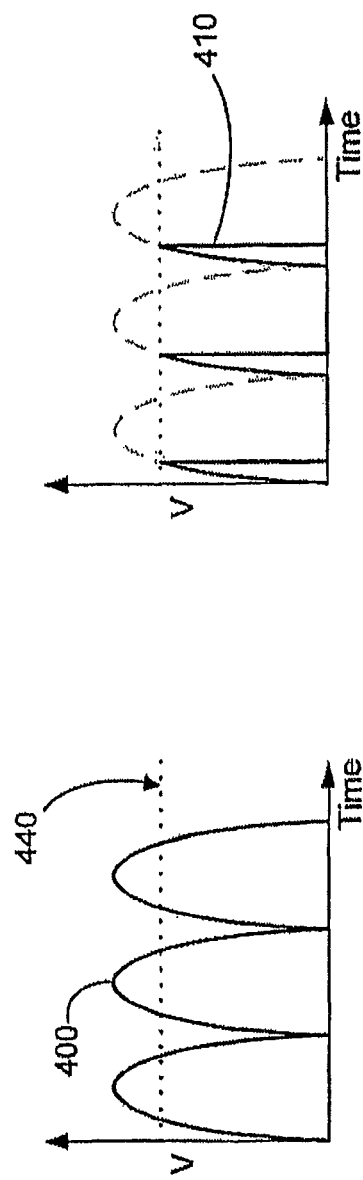
FIG. 4A (PRIOR ART)
FIG. 4B (PRIOR ART)
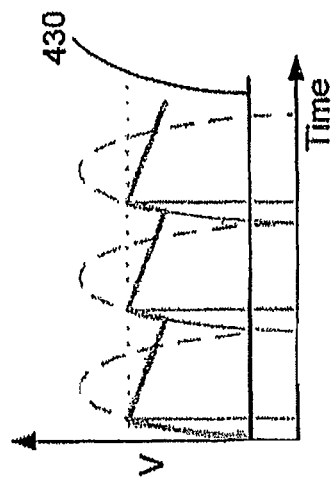
FIG. 4D (PRIOR ART)
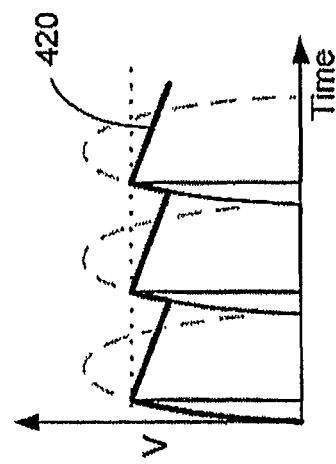
FIG. 4C (PRIOR ART)

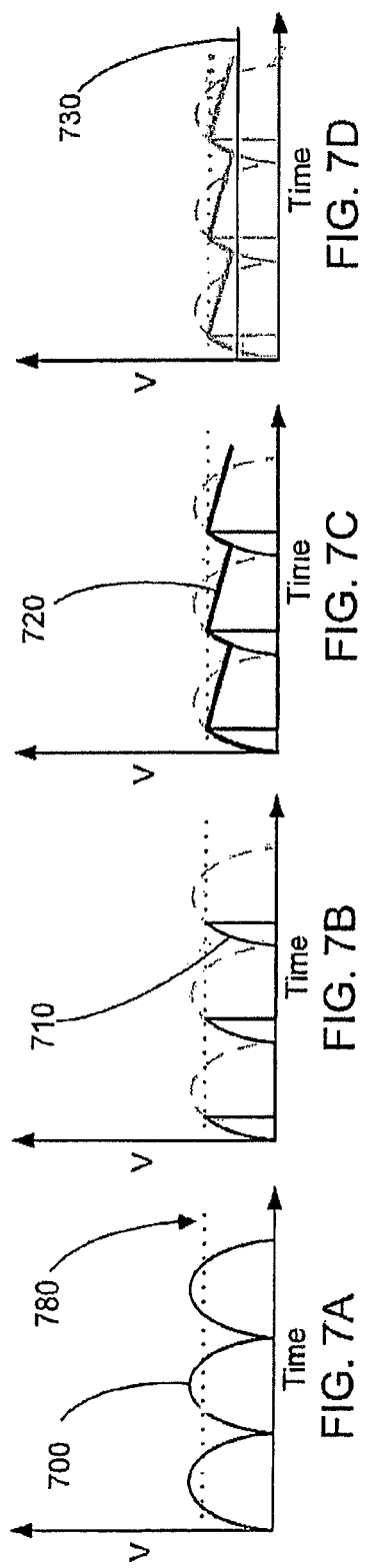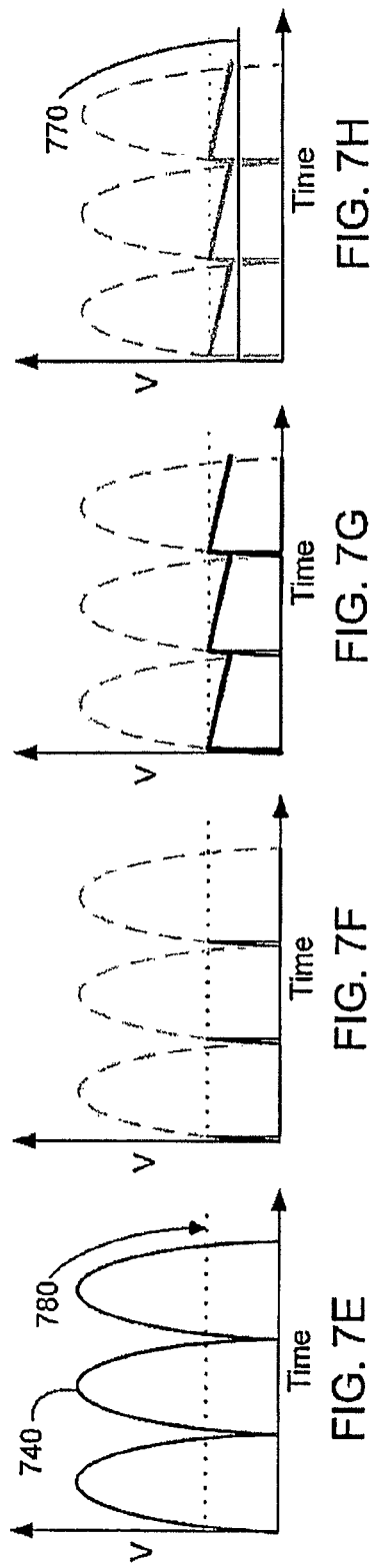

DEVICES AND METHODS FOR CONVERTING ALTERNATING CURRENT (AC) POWER TO DIRECT CURRENT (DC) POWER

CROSS-REFERENCE TO RELATED APPLICATIONS

This application is a continuation of U.S. patent application Ser. No. 12/270,985, filed Nov. 14, 2008, entitled "DEVICES AND METHODS FOR CONVERTING ALTERNATING CURRENT (AC) POWER TO DIRECT CURRENT (DC) POWER", now U.S. Pat. No. 8,451,627, which claims the benefit of U.S. Provisional Patent Application No. 60/988,565 filed Nov. 16, 2007, entitled "METHODS AND DEVICES FOR CONVERTING ALTERNATING CURRENT (AC) MAINS POWER TO DIRECT CURRENT (DC) POWER", all of which are incorporated herein by reference for all purposes.

TECHNICAL FIELD

The present invention relates generally to the conversion of high voltage alternating current (AC) to low voltage direct current (DC), and more particularly to devices and methods for converting high voltage AC to low voltage high current DC without the use of large high voltage filter capacitors or large high voltage switching power supplies.

BACKGROUND

Numerous applications, such as solid-state electricity metering and electricity grid automation devices, require accommodation of high voltage AC as input power yet must provide low voltage/high current DC output power for use by analog and digital circuitry. The power available in these environments, known as "line power," is typically supplied by an AC electric power utility and is usually within the range of 80 VAC and 600 VAC. The line power is the only power available for use with these types of applications, and the circuit board area and enclosure volume available to accommodate the power supply is often very limited.

Conventional systems attempt to provide AC to DC conversion, as presented in detail for example in U.S. Pat. No. 6,169,391, in four broad categories of power supplies: the transformer approach, the high voltage linear regulator approach, the high voltage capacitive coupling approach, and the switching power supply approach.

The transformer-based power supplies approach uses a step down transformer and some type of wave rectification. However, the disadvantage to all transformer approaches is the large size, cost, and power consumption of step down transformers, or the large size of other components such as capacitors that are used in conjunction with smaller transformers.

The high voltage linear regulator approach eliminates the large, costly step down transformer, but has the disadvantage of large capacitors and high power dissipation requirements.

The high voltage capacitive coupling power supplies approach also eliminates the step down transformer and reduces power consumption but adds design complexity and requires large capacitive elements.

The switching power supplies approach produces low voltage DC from high voltage AC by switching at a high frequency such that transformer size can be reduced. However, the transformer and switch elements in switching power supplies must be rated high enough to withstand the line voltage and switching transients. The filter capacitors at the input to switching power supplies must be rated to withstand the maximum line voltage and are required to have enough capacitance to maintain the voltage ripple within acceptable limits at the minimum line voltage. These two conditions result in physically large capacitors. These high voltage elements greatly increase the size and cost of switching power supplies and make it difficult to use these power supplies in space constrained applications, such as solid-state electricity metering and electricity grid automation devices.

For example, FIG. 1 is a diagram of a conventional switching power supply used to convert the AC line voltage 110 and produce DC output voltage 170. The power supply includes a bridge rectifier 120 and a DC-DC converter 100. It will be understood by those skilled in the art that the filter capacitor 130, the switch 140, and the transformer 150 all must be rated to withstand the peak of the maximum input voltage 110 with an adequate margin of safety. For example, for 600 VAC input this peak voltage is 848.5V. Thus, the filter capacitor 130, the switch 140, and the transformer 150 must be capable of withstanding 848.5V plus any switching transients that may be generated. The qualitative relationship between maximum input voltage (X-axis) and the size of the switching power supply (Y axis) is shown in FIG. 2. Exponential growth curve 200 indicates the relative effect of accommodating a large maximum input voltage on power supply size.

Some switching power supplies are commercially available as single chip solutions with an external switch. For example, a company called Supertex Inc., based in Sunnyvale, Calif. (see http://www.supertex.com) currently manufactures gating integrated circuits (ICs), such as the SR086 and SR087, which implement gating functions in a small SO-8 footprint. One of Supertex's patents, U.S. Pat. No. 6,169,391, discloses a device shown schematically herein in FIG. 3, which rectifies and regulates high voltage alternating current without the use of transformers, large capacitive coupling circuits, or high voltage linear regulators. The device includes a rectifier 320, a control circuit 330 for sensing the output voltage 350 of the rectifier 320 and switching on and off the input power, a storage capacitor 380 and a low voltage linear regulator 340. The control circuit 330 effectively divides the device into a high voltage subsystem 310 and a low voltage subsystem 315. Although this device allows conversion of high voltage AC to low voltage DC without the use of transformers, large capacitive coupling circuits, or high voltage linear regulators, the available current at the output 370 is less than 100 mA, which is not sufficient or suitable for use by solid-state electricity metering and electricity grid automation devices or any other application/components that requires more power or current.

Further, power supplies based on this type of design have typically attempted to produce logic level voltages (e.g., 3.3 V, 5.0 V) by reducing the gating-on time to a very low value. This results in very short duration high amplitude current spikes being drawn from the AC line, which, in turn, causes noise issues and also limits the available current to less than 100 mA, which reduces output power. Efficiency is also reduced because at small conduction angles, the time required by the switch to transition between the 'on' state and the 'off' state is a significant percentage of the total 'on' time. This transition period is a highly dissipative state of the switch and causes losses due to heating.

FIG. 4A through FIG. 4D illustrate a voltage waveform at different points in the circuit of FIG. 3. As shown in FIG. 4A, the voltage waveform 400 of the input 350 to the control circuit 330 is a rectified form of the input voltage at the same magnitude as the input voltage. The typical output from control circuit 330 for such an input 350 would be the voltage waveform 410 as shown in FIG. 4B, in which the circuit is closed whenever the full wave rectified voltage is below a prescribed threshold voltage 440, such as 40 Volts. However, the waveform 420 in FIG. 4C shows how the output 360 of the control circuit 330 is altered due to the presence of capacitor 380 in the circuit design of FIG. 3. The low voltage linear regulator 340 of FIG. 3 then produces the regulated DC output voltage waveform 430 as shown in FIG. 4D, though at a limited output power as noted above.

There is therefore a need for improved systems, devices, and circuit designs for converting high voltage AC to low voltage DC without the use of large high voltage filter capacitors or large high voltage switching power supplies, while also providing for high current DC outputs.

There is a further need to provide methods, systems, circuit designs, and devices to reduce the size and cost of a power supply module.

There are additional needs to provide methods, systems, circuit designs, and devices to increase the input voltage range of a DC-DC converter of a given size.

There are additional needs to provide methods, systems and designs to increase the input voltage range of a low voltage switching power supply of a given size.

There are further needs to provide methods, systems and designs to be able to use a low voltage (less than 80 VDC input voltage range) DC-DC converter in high voltage (80 to 600V) applications.

There are additional needs for methods, systems and designs, wherein high voltage AC is not allowed to propagate beyond a full wave rectifier and a transistor switch.

There are additional needs for methods, systems and designs, wherein a filter capacitor is required to be rated to only withstand a low voltage DC and not high AC line voltage.

There are yet further needs for methods, systems and designs, wherein the output power of a power supply does not change significantly with the output voltage.

There are additional needs for methods, systems and designs, wherein the need for large capacitive circuits and high voltage switching power supply is eliminated.

SUMMARY

Briefly described, and according to one embodiment, improved devices, circuit designs, systems, and methods for converting high voltage alternating current (AC) to low voltage direct current (DC) are disclosed herein. In one embodiment, an apparatus for converting alternating current (AC) line power to direct current (DC) power, comprises a rectifier for receiving a high voltage AC line power input and for outputting a full wave, high voltage DC, a gating component coupled to the rectifier for receiving the high voltage DC, output by the rectifier, wherein the gating component is configured to gate the high voltage DC by turning on at a zero crossing level and turning off when the high voltage DC exceeds a preset voltage threshold and wherein the output of the gating component is an intermediate voltage DC capped by the preset voltage threshold, and a DC-DC converter coupled to the gating component for receiving the intermediate voltage DC output by the gating component, wherein the DC-DC converter is configured to step down and smooth out the intermediate voltage DC to a desired high current, low voltage DC output.

In one feature of this embodiment, the rectifier is a bridge rectifier.

In another feature, the gating component is configured to remain off after the high voltage DC exceeds the preset voltage threshold and until the next zero crossing level. In another feature, the gating component includes transistor switches. Preferably, such transistor switches include one or more of an enhancement mode MOSFET, a depletion mode MOSFET, a bipolar transistor, a photo transistor, an IGBT (insulated gate bipolar transistor), an ESBT (emitter-switched bipolar transistor), and an SCR (silicon controlled rectifier).

In another feature, the gating component is a dimmer switch. Preferably, the high voltage AC line power input to the rectifier is preferably within the range of 60 to 480 voltage AC—particularly if the gating component is a dimmer switch.

In one specific commercial application, the high voltage AC line power input to the rectifier is preferably within the range of 80 to 600 voltage AC. However, it will be understood that the present apparatus and technology (and various components) are suitable for scaling up or down depending upon the needs of the particular application or use and are not tied to any specific VAC input limits.

In another specific commercial application, the preset voltage threshold is preferably set to 50 volts DC and the desired (or corresponding) high current, low voltage DC output is approximately 4 volts DC at 1000 milliamperes (mA).

Advantageously, with this embodiment, electronic components of the DC-DC converter only have to be rated high enough to handle (and can be sized much smaller than conventional DC-DC converter components because they only need to be able to handle) voltage levels up to the preset voltage threshold of the gating component.

Preferably, the DC-DC converter includes an input capacitor for smoothing out the intermediate voltage DC received from the gating component, a switch and a transformer for stepping down the intermediate voltage DC, and an output capacitor for smoothing out the stepped down intermediate voltage DC from the transformer to create the desired, high current, low voltage DC output. The DC-DC converter is or may be known alternatively as a low voltage switching power supply.

In some embodiments, a second output capacitor may be coupled to the output of the DC-DC converter to further smooth high current, low voltage DC output.

It will be understood by those skilled in the art that the output of the gating component is the intermediate voltage DC capped by the preset voltage threshold regardless of the high voltage AC line power input to the rectifier.

In another embodiment, an apparatus for converting high voltage DC to high current, low power DC, comprises a gating component configured to receive a rectified, full wave, high voltage DC, wherein the gating component is configured to gate the rectified, full wave, high voltage DC only between each zero crossing level and a preset voltage threshold associated with the rectified, full wave, high voltage DC and wherein the output of the gating component is a series of intermediate voltage DC waves capped by the preset voltage threshold, and a DC-DC converter coupled to the gating component for receiving the intermediate voltage DC waves output by the gating component, wherein the DC-DC converter is configured to step down and smooth out the intermediate voltage DC to a desired high current, low voltage DC output.

In a feature, the gating component includes transistor switches. Preferably, such transistor switches include one or more of an enhancement mode MOSFET, a depletion mode MOSFET, a bipolar transistor, a photo transistor, an IGBT, an ESBT, and a silicon controlled rectifier (SCR).

In another feature, the gating component is a dimmer switch. Preferably, the high voltage AC line power input to the rectifier is preferably within the range of 60 to 480 voltage AC—particularly if the gating component is a dimmer switch.

In one specific commercial application, the high voltage AC line power input to the rectifier is preferably within the range of 80 to 600 voltage AC. However, it will be understood that the present apparatus and technology (and various components) are suitable for scaling up or down depending upon the needs of the particular application or use and are not tied to any specific VAC input limits.

In another specific commercial application, the preset voltage threshold is preferably set to 50 volts DC and the desired (or corresponding) high current, low voltage DC output is approximately 4 volts DC at 1000 milliamperes (mA).

Advantageously, with this embodiment, electronic components of the DC-DC converter only have to be rated high enough to handle (and can be sized much smaller than conventional DC-DC converter components because they only need to be able to handle) voltage levels up to the preset voltage threshold of the gating component.

Preferably, the DC-DC converter includes an input capacitor for smoothing out the intermediate voltage DC received from the gating component, a switch and a transformer for stepping down the intermediate voltage DC, and an output capacitor for smoothing out the stepped down intermediate voltage DC from the transformer to create the desired, high current, low voltage DC output. The DC-DC converter is or may be known alternatively as a low voltage switching power supply.

In some embodiments, a second output capacitor may be coupled to the output of the DC-DC converter to further smooth high current, low voltage DC output.

It will be understood by those skilled in the art that the output of the gating component is the intermediate voltage DC capped by the preset voltage threshold regardless of the high voltage AC line power input to the rectifier.

In another embodiment, a method for converting alternating current (AC) line power to direct current (DC) power, includes the steps of rectifying a high voltage AC line power input and outputting a full wave, high voltage DC, gating the full wave, high voltage DC by turning on at a zero crossing level and turning off when the high voltage DC exceeds a preset voltage threshold and, thereby, outputting a series of intermediate voltage DC waves capped by the preset voltage threshold, stepping down the series of intermediate voltage DC waves to a lower voltage DC, and smoothing AC ripples from the lower voltage DC to create a desired, high current, low voltage DC output.

In a feature, the step of gating further comprises remaining off after the full wave, high voltage DC exceeds the preset voltage threshold and until the next zero crossing level.

In another feature, the method further comprises the step of smoothing AC ripples in series of intermediate voltage DC waves prior to the step of stepping down the intermediate voltage DC to the lower voltage DC.

In yet a further feature, the step of gating when the high voltage DC exceeds the preset voltage threshold protects electronic components responsible for the steps of stepping down and smoothing AC ripples.

In another feature, the components responsible for the steps of stepping down and smoothing AC ripples in the intermediate voltage only have to be rated to withstand voltages up to the preset voltage threshold.

In a further feature, the method further comprises the step of receiving the high voltage AC line power input.

In a further feature, the method further comprises the step of providing the desired, high current, low voltage DC output to other electronic components.

Other systems, circuit designs, devices, apparatuses, methods, processes, features, commercial applications, uses, and advantages of the present invention and scaled up or scaled down variations of the same will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 4A-4D illustrate the voltage waveforms corresponding to various locations on the schematic of the conventional power supply of FIG. 3.

FIGS. 7A-7H illustrate the voltage waveforms corresponding to various locations on the schematic of the preferred power supply module of FIG. 5.

DETAILED DESCRIPTION

Figure 1:
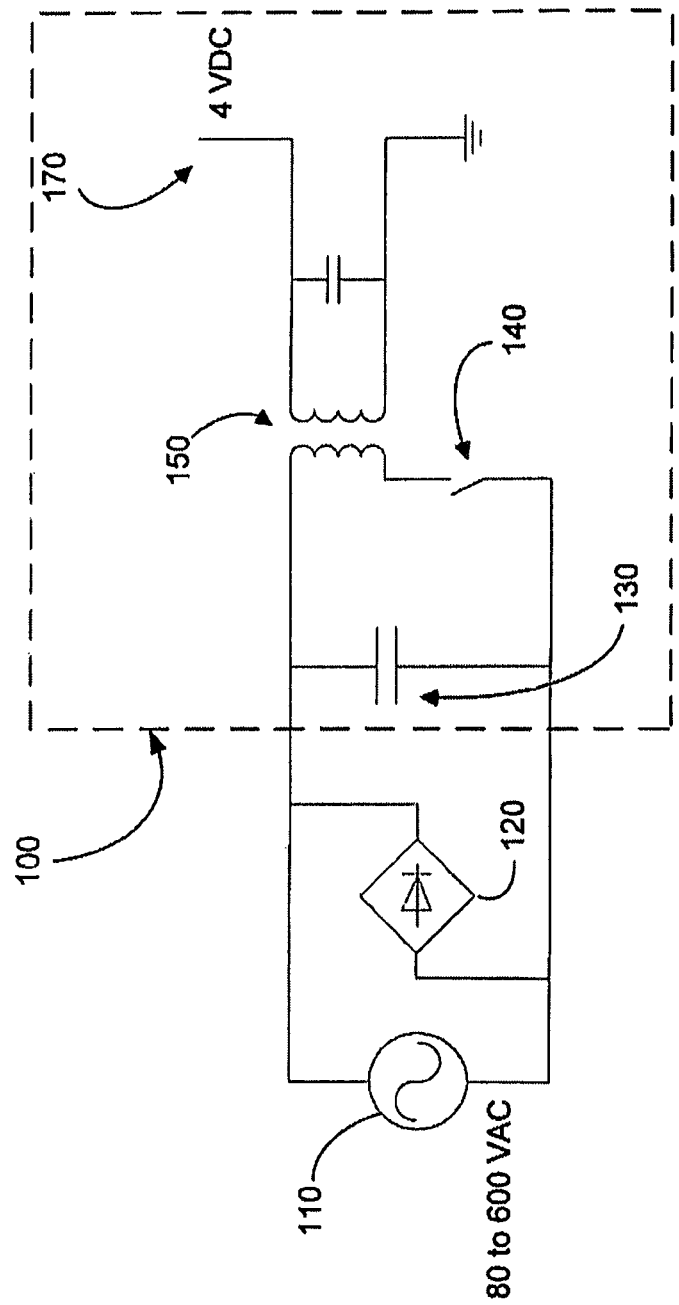
FIG. 1 is a schematic of a conventional low voltage switching power supply.
Figure 2:
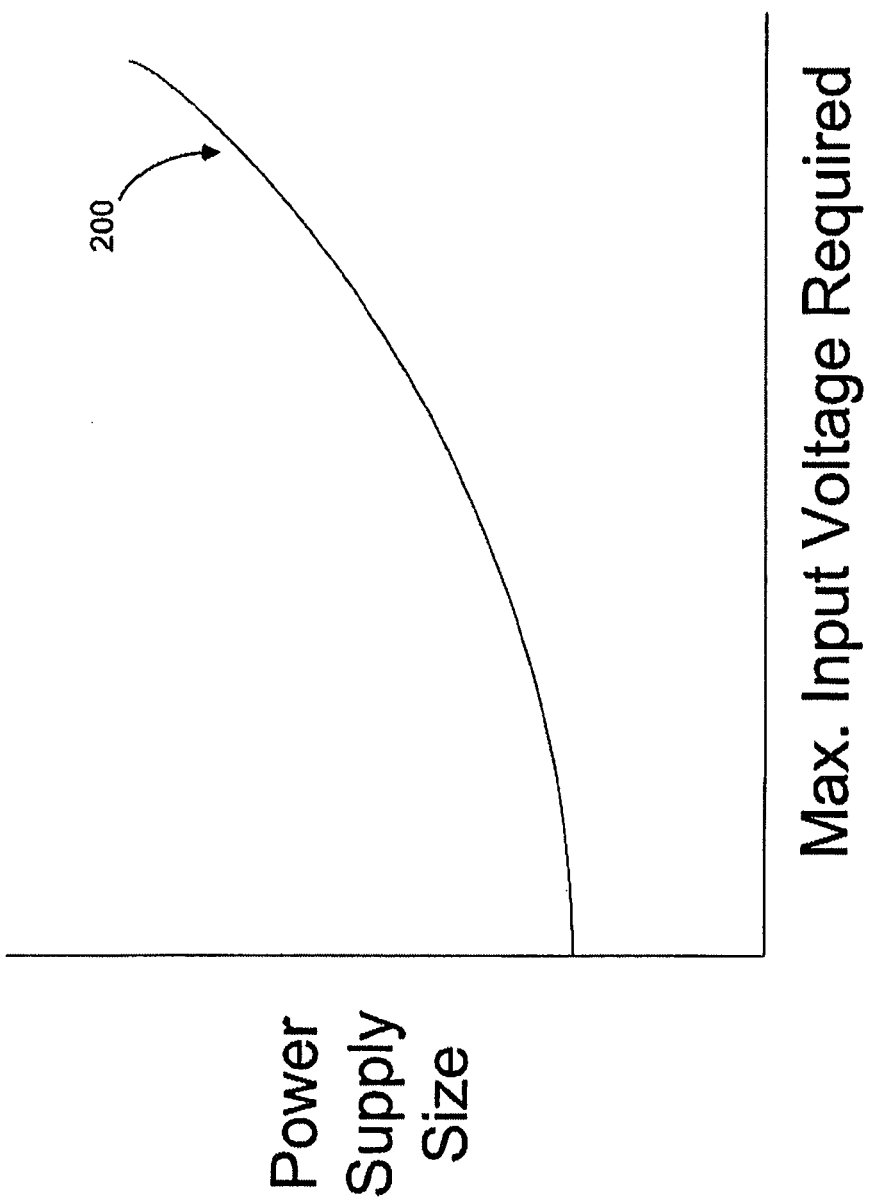
FIG. 2 is a plot of the qualitative relationship between the size of a low voltage switching power supply and the required maximum input voltage of the conventional low voltage switching power supply of FIG. 1.

Reference is now made in detail to the description of the preferred and exemplary embodiments of devices, systems, and methods for converting high voltage alternating current (AC) to low voltage direct current (DC), as illustrated in the accompanying drawings. The devices, systems, and methods disclosed herein may, however, be embodied in many different forms and should not be construed as limited to the embodiments set forth herein; rather, these embodiments are intended to convey the scope of the inventions to those skilled in the art. Furthermore, all "examples" given herein are intended to be non-limiting.

Various embodiments are described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Figure 5:
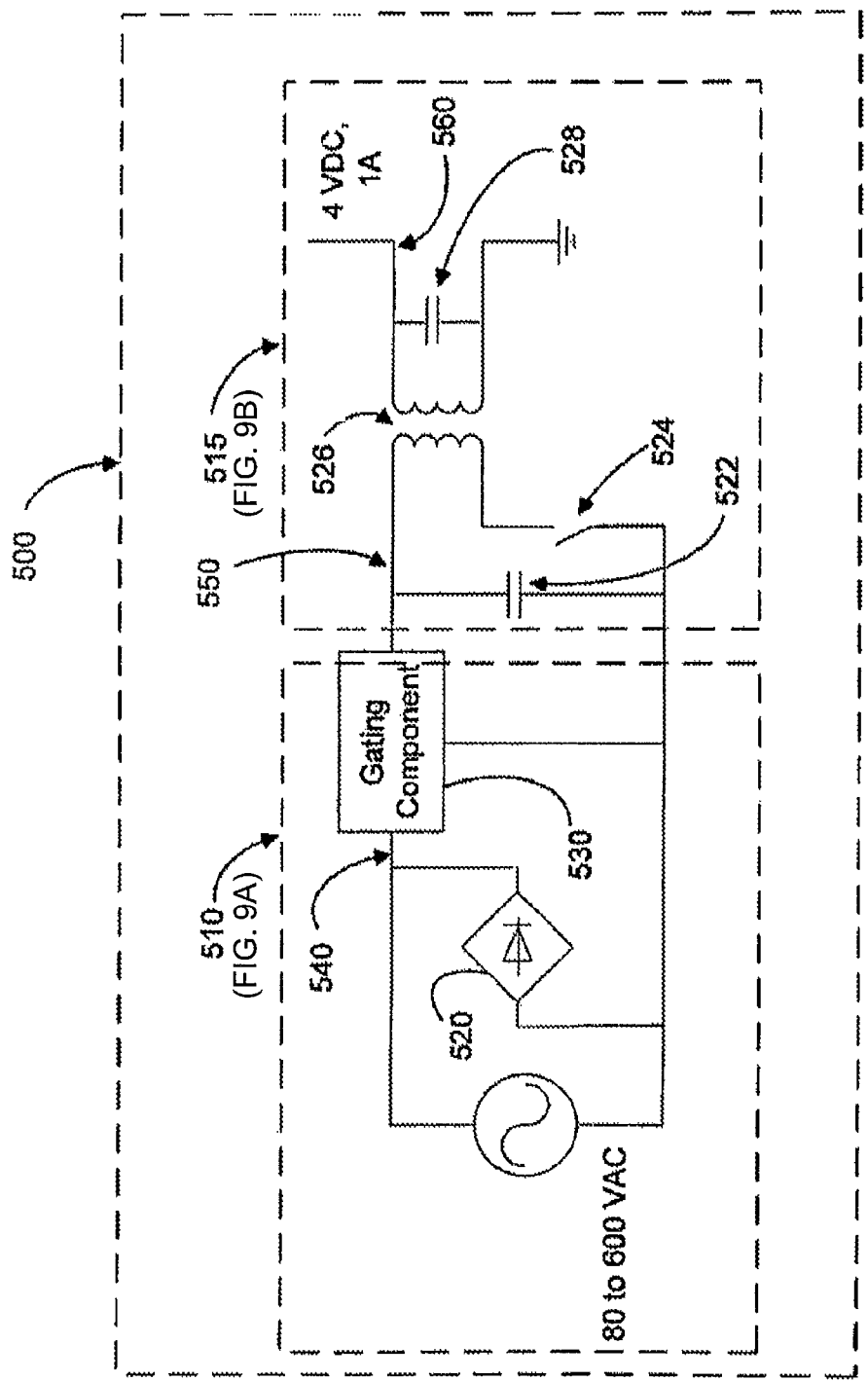
FIG. 5 is a schematic of a preferred power supply module disclosed and described herein.

Turning now to FIGS. 5 and 7, FIG. 5 is a schematic illustrating a preferred embodiment of a power supply module 500 for converting high voltage alternating current (AC) to low voltage direct current (DC) without the need for large filtering capacitors or high voltage switching power supplies. FIG. 7A through FIG. 7D and FIG. 7E through FIG. 7H illustrate a voltage waveform at different points in the circuit/power supply module of FIG. 5, as will be described in greater detail herein. As will become apparent to one of skill in the art, such a system and design provides a substantial increase in output power at lower output voltages with smaller individual components and smaller overall system size.

Specifically, turning to FIG. 5, a bridge rectifier 520 rectifies the AC input, which may range from 80 to 600 VAC, and provides a full wave rectified DC waveform at input 540 to the gating component 530, as shown by waveform 700 in FIG. 7A. The gating component 530 in effect divides the power supply module 500 into a high voltage subsystem 510 and a low voltage subsystem 515. A comparison of the FIG. 5 schematic with the FIG. 1 schematic shows that the capacitor 522, switch 524, and transformer 526 components in the low voltage subsystem 515 are connected in the same way as the components 130, 140, and 150, respectively, of the DC-DC converter 100. In FIG. 5, the addition of the gating component 530 moves the DC-DC converter components from a location of high voltage next to the rectifier 520 (as is done in the conventional system shown in FIG. 1) to a location of low voltage within the power supply—in other words, fully within the low voltage subsystem 515. By reducing the voltage presented to the DC-DC converter within the low voltage subsystem 515, the gating component 530 enables the DC-DC converter components in the low voltage subsystem 515 to be smaller than they are required to be if they were included in the high voltage subsystem 510, in which they would be required to accommodate the line voltage directly. Another way to view the impact of the gating component 530 on this system design is to consider the gating component 530 to be a way of increasing the voltage range capability of a DC-DC converter of a given size.

In one embodiment, the gating component 530 turns on at zero crossing and turns off when the input voltage exceeds a preset voltage threshold $V_T$ (shown as threshold 780 in FIG. 7A through 7H). The switch inside gating component 530 remains off until the next zero crossing when it turns on again and the cycle is repeated. An exemplary output waveform 710 of the output 550 from gating function (if there were no capacitor 522 included in low voltage subsystem 515) is shown in FIG. 7B. Exemplary transistor switches to carry out the gating component 530 include an enhancement mode MOSFET, a depletion mode MOSFET, a bipolar transistor, a photo transistor, an IGBT, an ESBT, and a silicon controlled rectifier (SCR), among other types of switch technology known to those of skill in the art.

As one with skill in the art will appreciate from a closer study of FIG. 5, in order to use a standard "off the shelf" DC-DC converter with maximum input voltage capability of a particular voltage (e.g., 72V), one must set the gating circuit to "cut off" at that voltage (e.g., 72V). One skilled in the art will further appreciate that the input voltage range of any DC-DC converter can be substantially increased by using this method. In addition, this technique also allows the DC-DC converter to utilize AC power.

During its ON state, the gating component 530 provides low voltage DC 710 as shown in FIG. 7B and the AC ripple 720 is filtered by the capacitor 522 coupled to its output 550, as shown in FIG. 7C. When the full wave rectified output 540 rises above the predetermined threshold voltage (at whatever level that is set to), the gating component 530 opens (off-state, off-period) and no current flows to the low voltage subsystem 515. Because the gating component 530 turns off and removes the charging current to the low voltage subsystem 515 when the full wave rectified output 540 increases above the predetermined threshold voltage, the capacitor 522 and other power supply components within the low voltage subsystem 515 are never utilized beyond their predetermined threshold voltage. Since voltage for these components is limited, the large (and bulky) high voltage capacitors that require large portions of printed circuit board (PCB) space are not required in implementations according to the preferred embodiments of the present systems, devices, and methods.

Within the low voltage subsystem 515, the capacitor 522 reduces the AC ripples from the intermediate voltage DC at output 550 and provides a pre-regulated intermediate voltage DC to the switch 524 and transformer 526. These components step the pre-regulated intermediate voltage DC down, with another capacitor 528 to further reduce the AC ripples, to a predetermined final voltage DC 560 as shown as curve 730 in FIG. 7D.

While the intermediate voltage DC 550 can optionally be adjusted by changing the threshold voltage at which the gating function opens (turns off) to a different predetermined threshold voltage, such an adjustment is no longer required for providing a low output voltage DC 560 as long as the regulated intermediate voltage DC 550 is within the input voltage range of the low voltage subsystem 515. As a result, the output power available for a particular output voltage 560 of the low voltage subsystem 515 does not change significantly for different values of output voltage 560.

It should also be noted that the conduction angle for transistors within the gating component 530 remains at the maximum value determined by the input voltage rating of the low voltage subsystem 515. The larger conductions angle reduces the effect of turn-on and turn-off times of the gating component 530 and allows transistors within gating component 530 to operate more efficiently.

Additionally, the intermediate regulated low voltage DC 550 is maintained at the predetermined threshold voltage (50 V in this instance). Maintaining a value for the intermediate regulated low voltage DC 550 that is much higher than the voltage drop across the transistor reduces the effect of the voltage drop across the gating component 530, and therefore is believed to improve efficiency.

The components within the low voltage subsystem 515 need only be rated to sustain the predetermined threshold voltage of the gating circuit 530. There is no need for rating these components according to the line power 110 supplied by the AC power utility, since the high voltages do not propagate beyond the full wave rectifier 520. For example, if the predetermined threshold voltage is 50.0 V, the components of the low voltage subsystem 515 need only be rated for 60.0 V rather than the 850V that would be required by a conventional switching power supply module. As a result, the low voltage subsystem 515 is much smaller and more cost effective than a conventional switching power supply.

Figure 3:
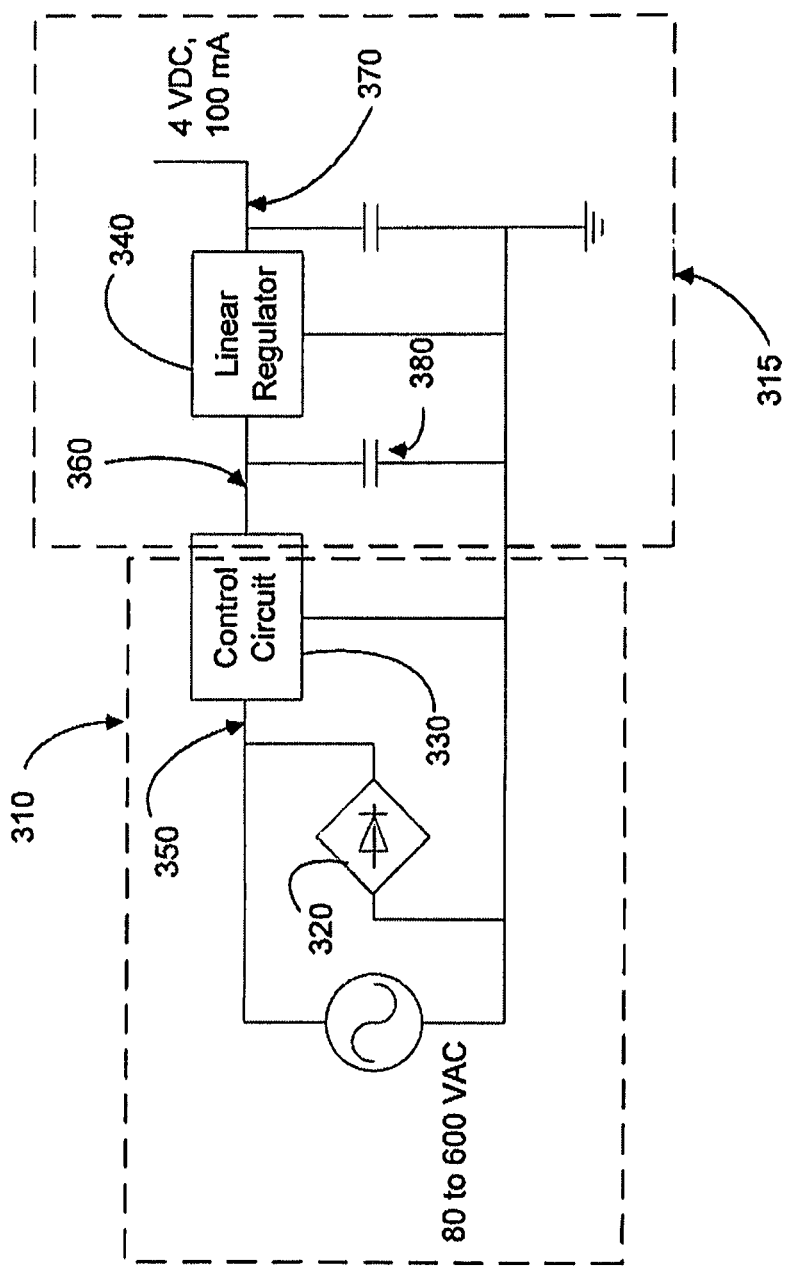
FIG. 3 is a schematic illustrating a conventional power supply using a control circuit to divide high voltage and low voltage subsystems.

One skilled in the art will note that the high voltage subsystem 510 of FIG. 5 is similar to the high voltage subsystem 310 of FIG. 3 in which the control circuit 330 performs a similar function as gating component 530. However, in the conventional system design represented by FIG. 3, the low voltage subsystem 320 contains a linear regulator 340 that constrains the power available at output 370. In contrast the low voltage subsystem 515 of preferred embodiments of the present system provide high power at output 560.

EXAMPLE

It is apparent that the exemplary power supply module 500 described herein provides an increase in efficiency while also providing a significant increase in output power at low output voltages 560. In one exemplary use, allowing for 90% efficiency for the low voltage subsystem 515 and with the intent to provide an output voltage 560 of 5.0 V, the output power provided is given by:

$$P = V * I * \eta \quad (1)$$

where the V is the intermediate regulated low voltage DC 550 supplied by the gating component 530 (50.0 V in this instance) and I is the current at the output of the gating component 530. The efficiency of the low voltage subsystem 515 is represented by η. Using the above values gives:

$$P = 50.0V * 0.1A * 0.90 = 4.5W \quad (2)$$

This output power is independent of output voltage 560 because as output voltage 560 is reduced, the output current increases in the same proportion.

In contrast, conventional gated power supplies working alone provide the power according to the following standard equation:

$$P_{conv} = V_{conv} * I_{conv} \quad (3)$$

where $V_{conv}$ is the output voltage and $I_{conv}$ is the output current. The max output current of 0.1 A stays the same at 5V or 50V and hence providing the same output voltage 560 of 5V gives an available power $P_{conv}$ of:

$$P_{conv} = 0.5V * 0.1A = 0.5W \quad (4)$$

As is evident in the results given in equations (2) and (4) above, the exemplary power supply module 500 provides an output power of 4.5 W compared to 0.5 W for a conventional gated power supply, or nine times the output power provided at 5V using a conventional gated power supply, such as the power supply 100 shown in FIG. 1. The increase in power at lower output voltages such as, for example, 3.3V and 2.5V, is even more dramatic.

Figure 6A:
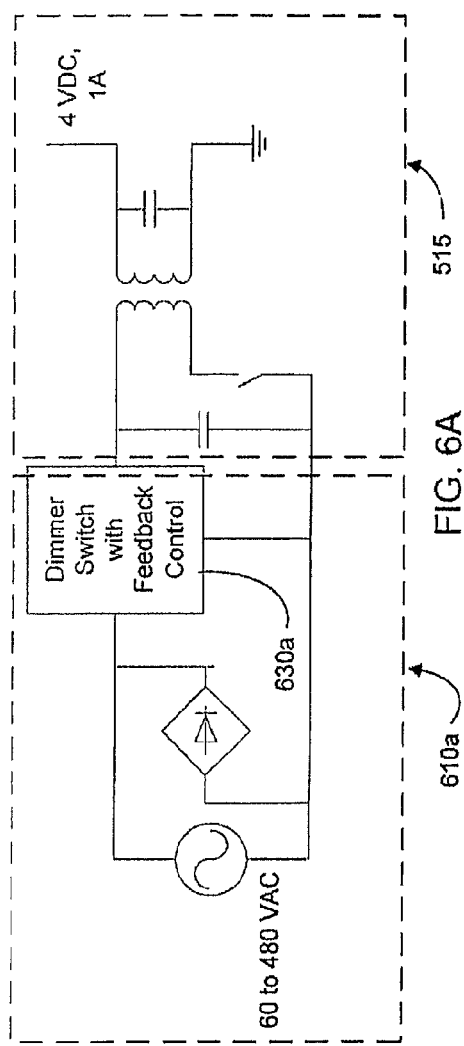
FIGS. 6A and 6B illustrate respectively alternative embodiments for implementing the gating component or gating function of the exemplary power supply modules shown in FIG. 5.

FIG. 6A is a schematic illustrating another embodiment of a power supply module for converting high voltage alternating current (AC) to low voltage direct current (DC). In this embodiment, the gating component 530 is carried out in the high voltage subsystem 610a by the use of a standard dimmer switch with a simple feedback control system 630a. Such an embodiment is suitable, for example, when the line voltage is expected to be between 60 and 480 VAC.

Figure 6B:
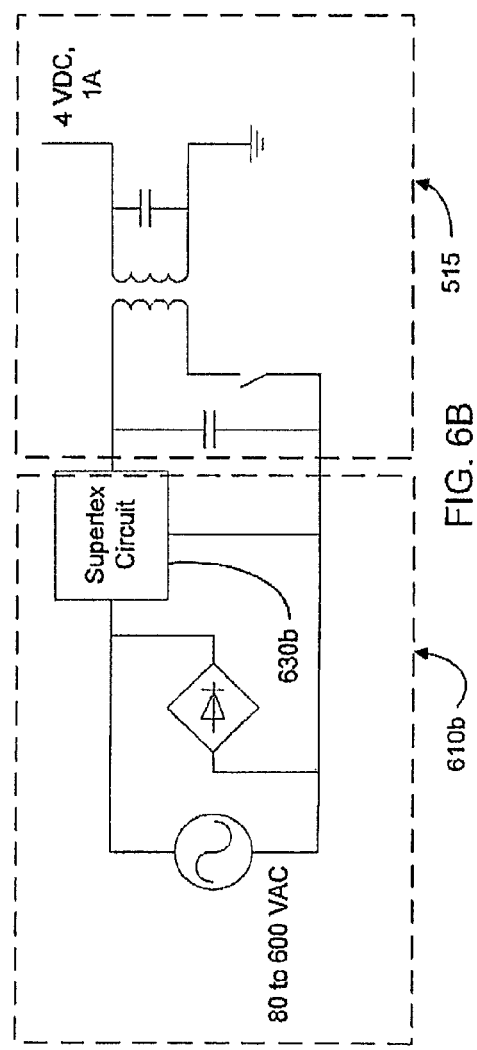

FIG. 6B is a schematic illustrating another embodiment of a power supply module for converting high voltage alternating current (AC) to low voltage direct current (DC). In this embodiment, the gating component 530 is carried out in the high voltage subsystem 610b by the use of one component circuit 310 from the circuit of FIG. 3, but without using the linear regulator 315 of the circuit in FIG. 3. Specifically, the linear regulator 310 of FIG. 3 is replaced by the DC-DC converter 515. Such an embodiment is suitable, for example, when the line voltage is expected to be between 80 and 600 VAC.

As previously discussed, FIG. 7A illustrates a full wave rectified voltage 700 according to the rectifier output voltage 540 of FIG. 5. FIG. 7B illustrates an output voltage waveform 710 corresponding to the output of gating component 530, if there is no capacitor 522. When the full wave rectified output 700 voltage increases above the predetermined threshold voltage 780, the gating component 530 opens (turns off). As long as the input voltage (corresponding to the full wave rectified output shown in FIG. 7A) remains above the predetermined threshold voltage 780, the gating component 530 does not conduct (i.e., remains turned off). The gating function switches to on (and thus conducts) when the zero crossing is reached. In preferred embodiments, the predetermined threshold voltage 780 will be set to 50.0 V in order to achieve an output of 4 volts DC at 1 amp. However, it will be noted by those of skill in the art that the gating component 530 may be configured for any desired predetermined threshold voltage according to the input requirements of the low voltage subsystem 515. It should be noted also that, for maximization of output power and efficiency, the gating component 530 uses a transistor switch, which should typically be configured to have the highest threshold voltage that falls within the input voltage range of the low voltage subsystem 515. The output voltage waveform 710 depicts the voltage for which the gating component 530 remains conducting (turned on). The capacitor 522 receives the voltage depicted by the output voltage waveform 710 and is charged by the corresponding current, providing a smoothed voltage waveform 720, as shown in FIG. 7C. The AC ripple at the intermediate voltage DC output 550 of the gating circuit 530 is smoothed by the capacitor 522, and is provided as the input to the remainder of the low voltage subsystem 515 components 524, 526, and 528, which produce smooth DC voltage 560, as shown by voltage 730 in FIG. 7D. FIG. 7A through FIG. 7D show the behavior of power supply 500 when the input voltage 700 is relatively low compared to the gating function threshold voltage 780.

By way of comparison, FIG. 7E through FIG. 7H show the impact of a much higher input voltage 740 given the same gating function threshold voltage 780. Although the input voltages are significantly different in magnitude, the quality of the output voltage 770 is the same and exactly the same system components are used.

In the exemplary embodiments in FIG. 5, FIG. 6A, and FIG. 6B, the intermediate voltage DC has a rating of 50.0 V at 100 mA and the output voltage 560 is about 4.0 V DC with a current rating of about 1000 mA. Those of skill in the art will readily appreciate that the DC gated power supply may be configured to provide different values of intermediate voltage DC to the low voltage subsystem 515. It will also be appreciated that the low voltage subsystem 515 may be configured to provide different output voltage 560 values and current ratings.

The gating component 530 operates to mask changes in the input voltage, thus preventing input voltage changes from affecting the remainder of the circuit components in the low voltage sub system 515. The result is a wide input voltage 540 operating range that does not appreciably affect output voltage 560. The output voltage 560 remains unchanged even though the input voltage 540 changes.

The gating component 530 within the DC gated power supply operates to prevent downstream components from exposure to large DC voltages. Once the predetermined threshold voltage is reached, the gating circuit is turned off and the downstream exposure is limited to the value of the predetermined threshold voltage. The large DC voltages are not propagated beyond the full wave rectifier 520 and the gating component 530.

The filter capacitors 522 and 528 are in the low voltage subsystem 515 of the power supply module 500, and therefore smaller low voltage capacitors are utilized. Also, PCB traces are closer together due to lower voltages and require less PCB space, thus further reducing the size of the power supply module 500.

It should also be noted that since the low voltage subsystem 515 is not exposed to high voltages, its components are smaller and the design layout is more compact, thus reducing the size of the power supply module 500 even further. Additionally, the variations in the input voltage are limited to the gating component 530 and do not reach the components of the low voltage subsystem 515, allowing for a simplified design. Thus, the size of the power supply module 500 is reduced even further.

Another benefit of gating the full wave rectified DC on at zero crossing is reduction in noise when compared with power supplies that gate on at peak voltage and utilize a full wave diode rectifier immediately followed by a capacitor filter.

Figure 8:
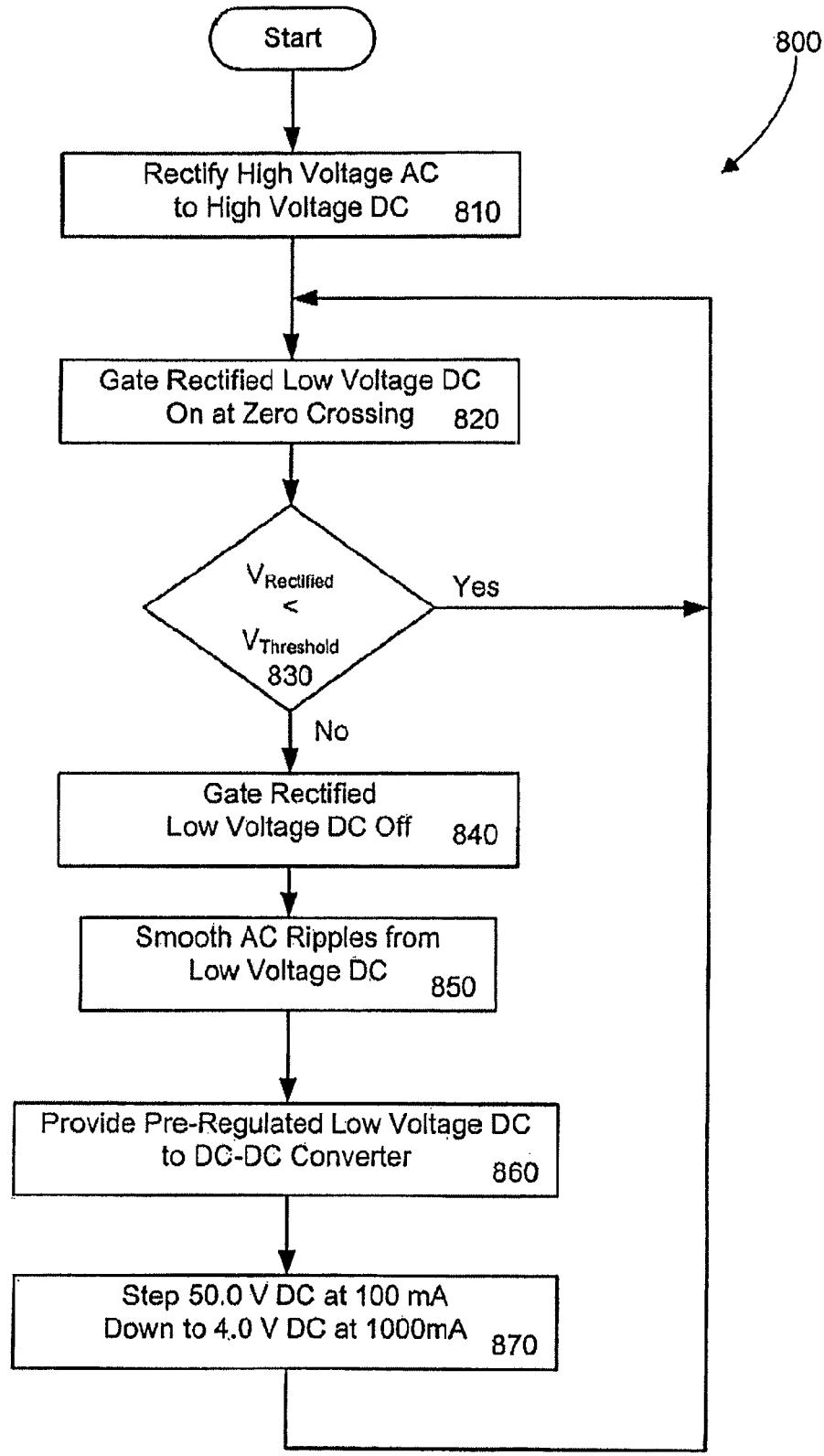
FIG. 8 is a flow chart illustrating the high level steps taken to reduce high voltage AC to low voltage high current DC using a module similar to that shown in FIG. 5.

FIG. 8 illustrates steps 800 for converting high voltage AC to low voltage DC according to the present methods, systems, and devices. Line power is received from an AC power utility and the high voltage AC is rectified to a high voltage DC at step 810. The rectifying is typically performed by a bridge rectifier. At step 820 a determination is made whether the full wave rectified output, $V_{Rectified}$, is below a predetermined threshold voltage, $V_{Threshold}$. In one exemplary embodiment, $V_{Threshold}$ is 50.0 V. If $V_{Rectified}$ is below $V_{Threshold}$, then a transistor switch is closed, e.g., on-state, on-period, etc, at step 830. If $V_{Threshold}$ is not below $V_{Rectified}$, then the transistor switch is opened (e.g., off-state, off-period, etc.) at step 840. Typical embodiments of transistor switches include an enhancement mode MOSFET, a depletion mode MOSFET, a bipolar transistor, an IGBT, an ESBT, or a silicon controlled rectifier (SCR), among other types of switch technology.

A closed transistor switch is maintained in an on-period so long as the rectified high voltage DC is below the predetermined threshold voltage $V_{Threshold}$. AC ripples are smoothed from the low voltage DC at step 850. The smoothing provides a pre-regulated low voltage DC and is typically performed by a small, low voltage capacitor. Since the transistor switch is opened upon $V_{Rectified}$ exceeding $V_{Threshold}$, the voltage at the capacitor will never exceed $V_{Threshold}$, and a small, low voltage capacitor is all that is necessary. Since the capacitor is never charged above $V_{Threshold}$, the required PCB space is reduced.

At step 860, the smoothed pre-regulated intermediate voltage DC is provided to a DC-DC converter. The DC-DC converter or low voltage subsystem of an exemplary power supply module is typically a low voltage switching power supply configured for stepping the pre-regulated intermediate voltage DC to a predetermined low voltage DC as at step 870. Typical values for the low voltage DC are 3.3 V and 5.0 V, as these voltages are common for usage in logic circuits and microprocessors. Of course, those of skill in the art will readily appreciate that other values for low voltage DC may be used.

As noted above, when $V_{Rectified}$ reaches $V_{Threshold}$, the transistor switch is opened, e.g., off-state, off-period, etc. at step 830. In either event, the pre-regulated intermediate voltage DC is maintained until $V_{Rectified}$ drops below $V_{Threshold}$. Once $V_{Rectified}$ drops below $V_{Threshold}$, the transistor switch is closed again.

Figure 9A:
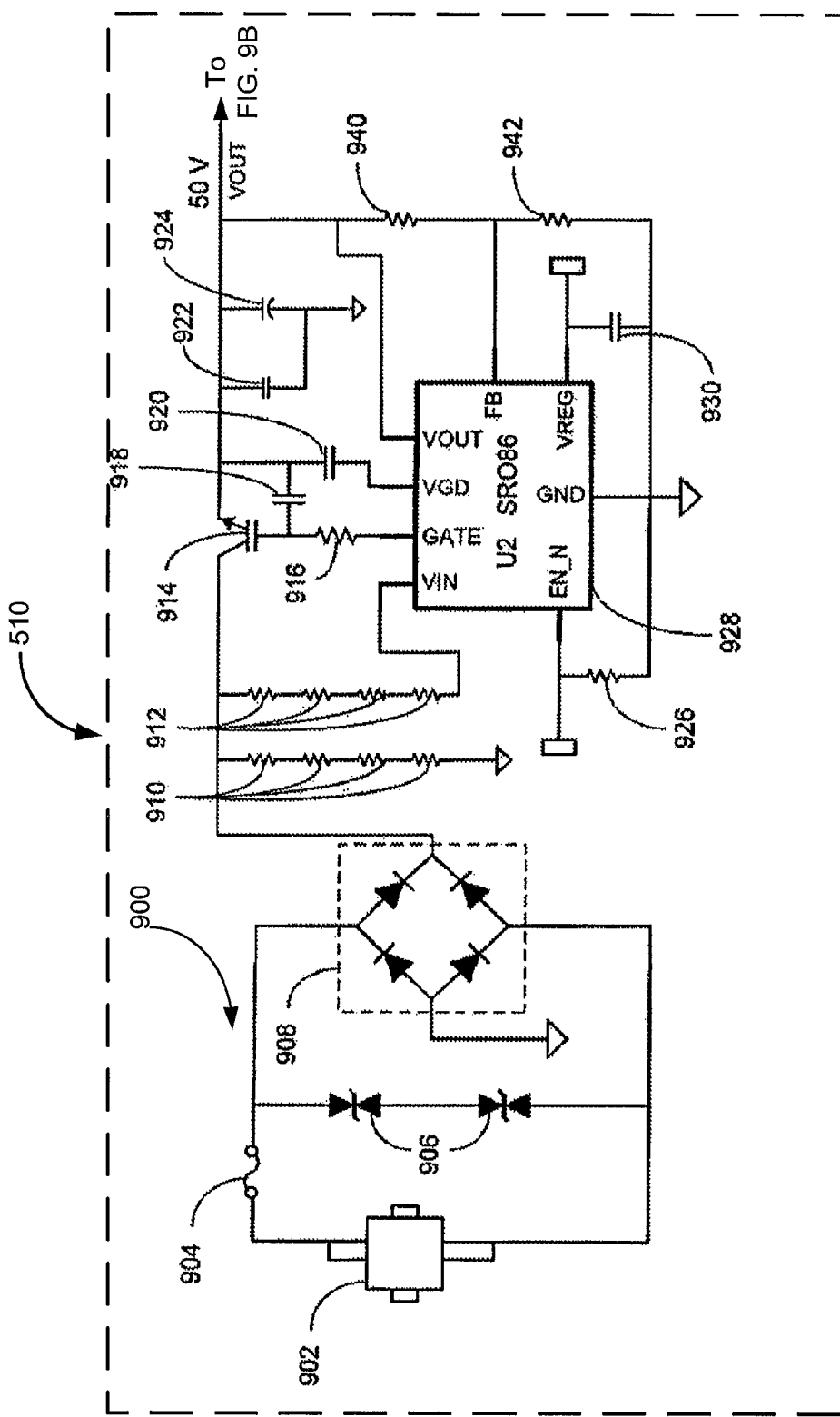
FIGS. 9A and 9B show a detailed circuit diagram of one embodiment of a preferred power supply module disclosed and described herein.

FIG. 9A is a schematic diagram 900 illustrating a rectifier and DC gated power supply portion of one embodiment of a power supply module for converting high voltage AC to low voltage DC. Line power is typically provided from an AC power utility at header 902 and the power supply is protected by an SMT Fuse 904 rated at 1.25 A and transient voltage suppressors (TVS) 906 rated for 260 V and 1500 W. A high voltage bridge rectifier 908 provides a full wave rectified DC voltage to an SR086 integrated circuit (IC) 928 for gating. An output $V_{Out}$ of 50.0V is provided from the SR086 IC 928 for input to the DC-DC converter portion in FIG. 9B.

Biasing resistors 910 and 912 for $V_{In}$ have values of 100K ohms and 261K ohms respectively. The IGBT transistor 914 provides the switched connection between the output of the bridge rectifier and the input to the DC-DC converter. Resistor 916 is used in conjunction with capacitors 918 to reduce EMI, capacitor 920 reduces ripple across the gate drive circuitry, and capacitor 930 reduces ripple across the comparator circuitry. Capacitors 922 and 924 filter the ripple from the intermediate voltage used to feed the DC-DC converter. Resistor 926 is the pulldown resistor for the active low enable input, and resistors 940 and 942 are used to set the voltage threshold. The largest capacitor (by physical size and capacitance) is capacitor 924.

The components of FIG. 9A provide a full wave rectified DC that is gated on at zero crossing by the gating circuit and remains on until a predetermined threshold voltage is reached. Thus, an intermediate voltage DC is provided that is smoothed and then provided to the switching power supply 950 of FIG. 9B.

Figure 9B:
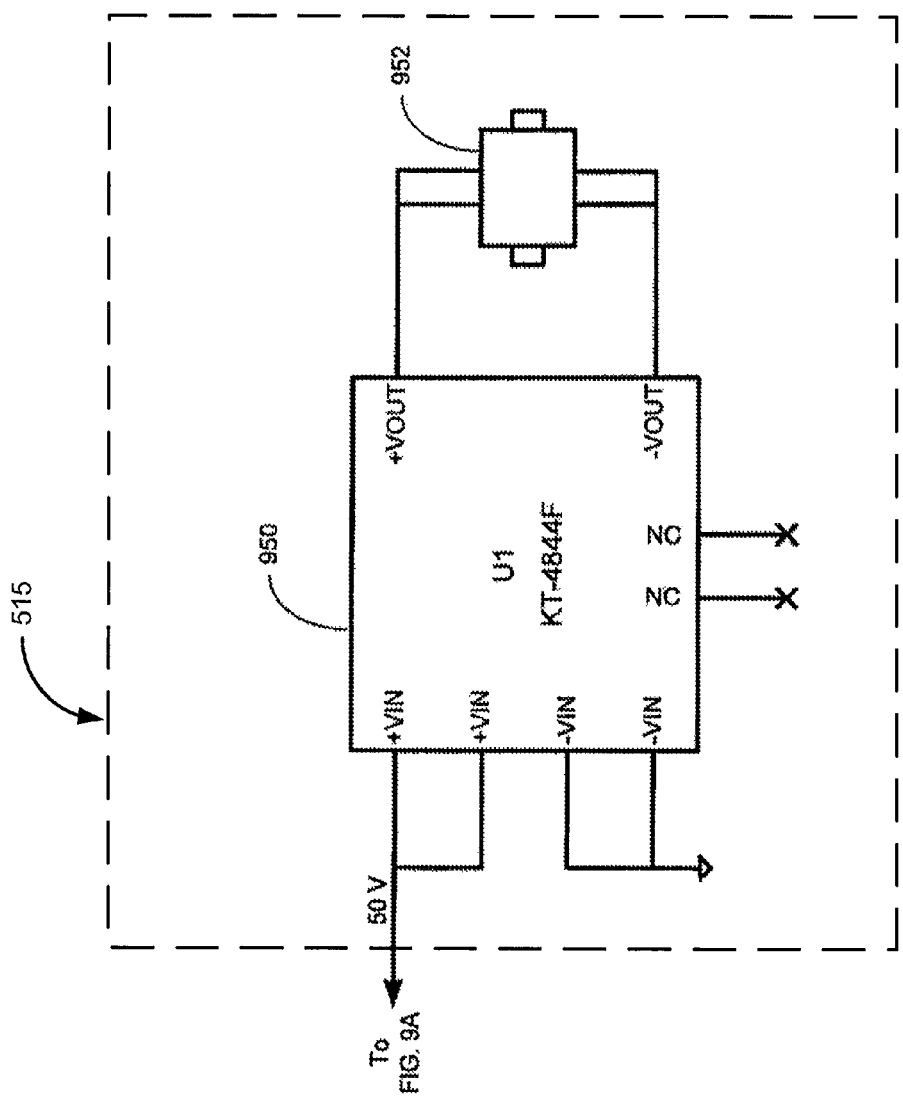

While typical conventional switching power supplies often require several large (and bulky) high voltage capacitors, it will be appreciated that the embodiment shown in FIG. 9A and FIG. 9B includes a single large electrolytic capacitor 924 (470 µF). The reduction in PCB size is appreciable.

FIG. 9B is a schematic diagram illustrating a DC-DC converter 950 portion of one embodiment of a power supply module for converting high voltage AC to low voltage DC. An input voltage $V_{In}$ of 50.0 V ($V_{Out}$ from FIG. 9A) is provided to the DC-DC converter 950. The DC-DC converter is configured in this embodiment to convert the intermediate voltage DC (50.0V at 100 mA) to an output voltage 952 that is about 4.0 V DC with a current rating of about 1000 mA. Those of skill in the art will readily appreciate that the DC gated power supply portion may be configured to provide different values of intermediate voltage DC to the DC-DC converter or low voltage switching power supply 950. It will also be appreciated that the DC-DC converter may be configured to provide different output voltage 952 values and current ratings.

Figures 10A, 10B:
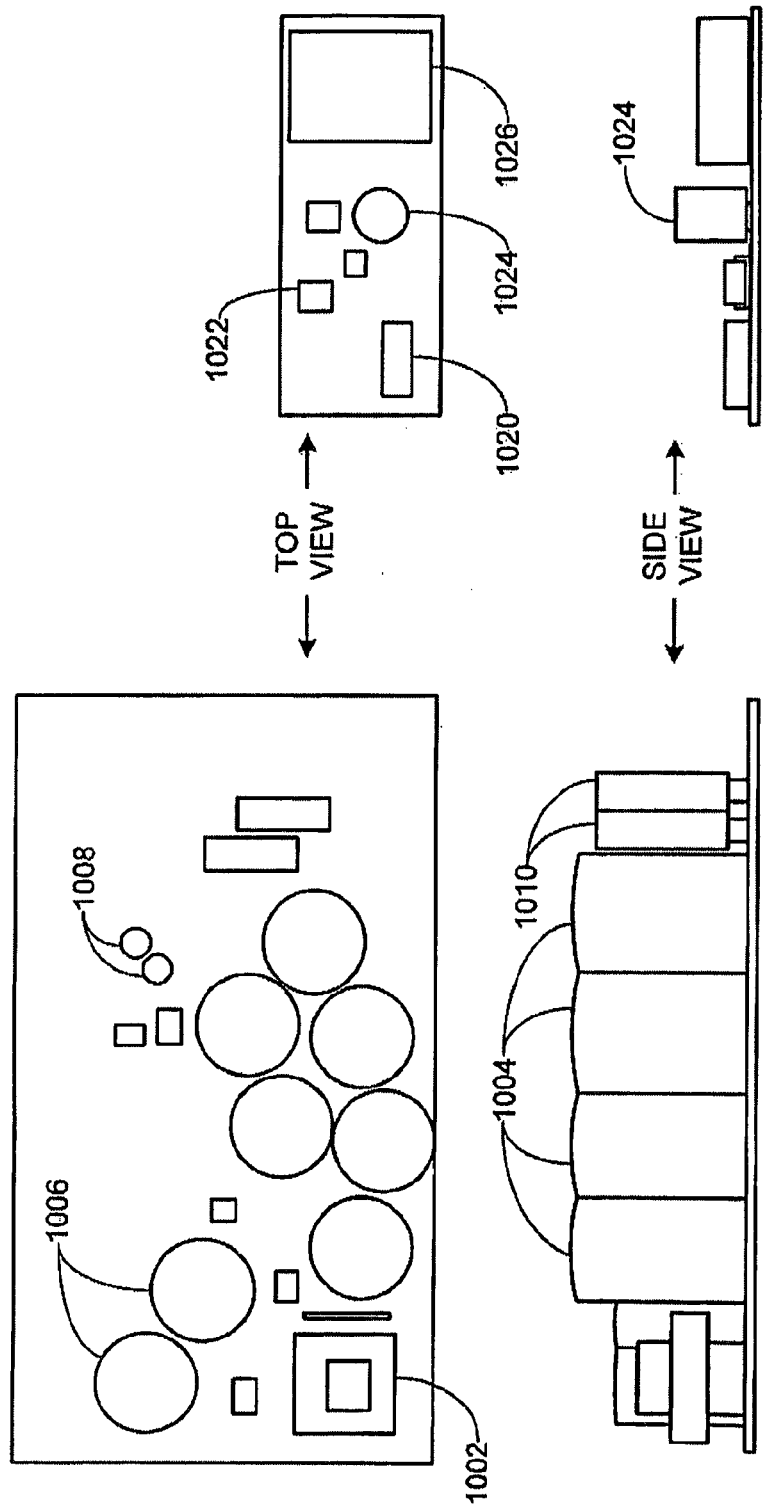
FIGS. 10A and 10B are drawings showing the difference in size between a conventional low voltage switching power supply for high voltage input (FIG. 10A) and a preferred embodiment of an improved apparatus disclosed and described herein (FIG. 10B), given identical input and output constraints.

FIG. 10 illustrates a top view and a side view of a conventional power supply (FIG. 10A) compared with an embodiment of the present power supply for converting high voltage AC to low voltage DC (FIG. 10B). While not illustrated to precise scale, FIG. 10 illustrates the appreciable size reduction realized from embodiments of the present inventions.

For example, a typical conventional power supply as shown in FIG. 10A includes a switching transformer 1002, six bulky 350V 22 µF capacitors 1004, and two large 3300 µF capacitors 1006 for filtering the output. Additionally, there are two fusible resistors 1008 and two 520 V MOVs 1010 to protect against transient voltages.

As illustrated in FIG. 10B, an exemplary embodiment according to the present invention requires dramatically less PCB space with its main components being a fuse 1020, a bridge rectifier 1022, a single large electrolytic capacitor 1024, and a DC-DC converter 1026, such as a low voltage switching power supply.

Figure 11:
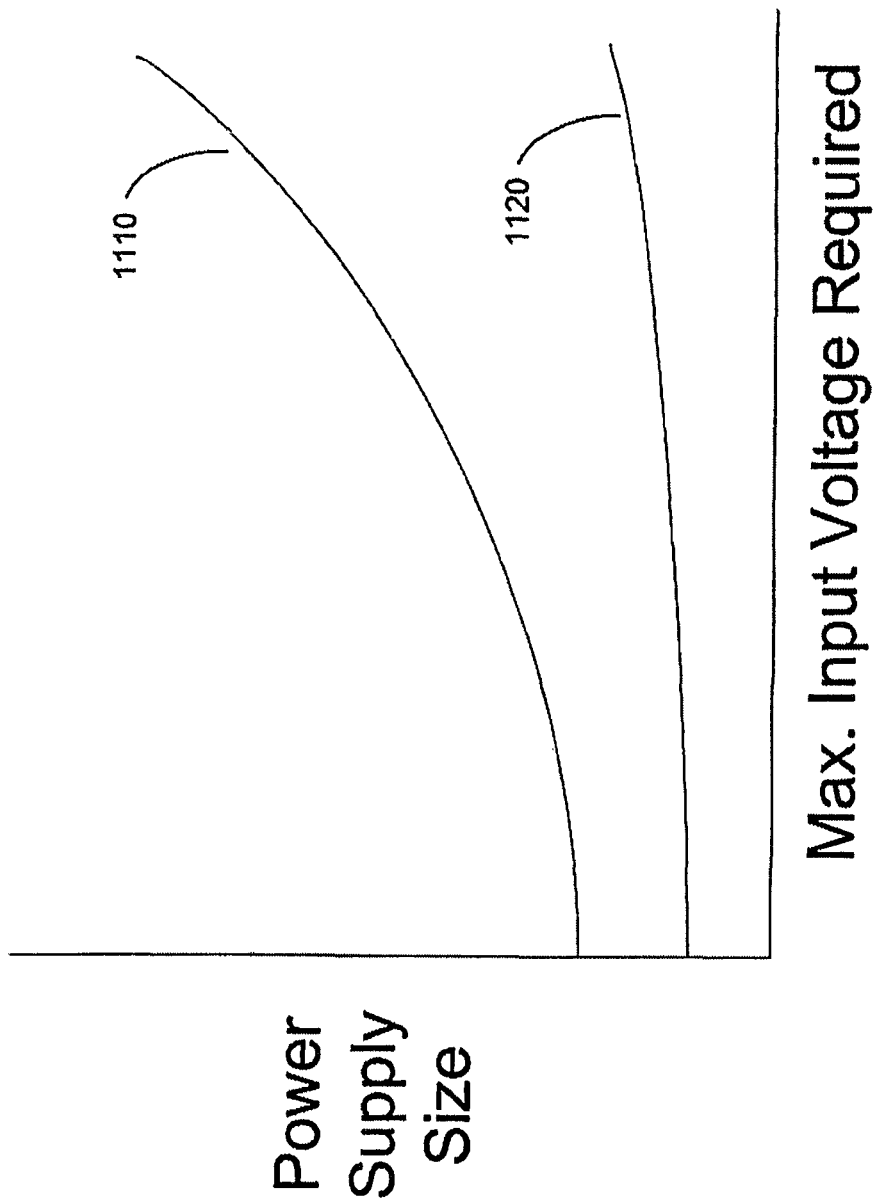
FIG. 11 is a plot of the qualitative relationship between the size of a low voltage switching power supply and the required maximum input voltage, and the qualitative relationship between a low voltage switching power supply for high voltage input and one preferred embodiment of an improved apparatus disclosed and described herein, given identical input and output constraints.

The qualitative impact of the maximum input voltage required on the size of the conventional power supply (FIG. 10A) and an embodiment of the present invention (FIG. 10B) is shown in FIG. 11 where the curve 1110 represents conventional power supplies and curve 1120 represents power supplies built using the improved methods, devices, and systems as described herein.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art which the present invention pertains without departing from its spirit and scope. Accordingly, the scope of the present invention is defined by the appended claims rather than the foregoing description and the exemplary embodiments described therein.

What is claimed is:

1. An apparatus to convert alternating current (AC) line power to direct current (DC) power, comprising:
   a rectifier to receive a high voltage AC line power input and to output a full wave rectified high voltage DC;
   a voltage-reducing voltage regulator coupled to the rectifier to receive the full wave rectified high voltage DC and to provide an intermediate voltage DC capped by a preset voltage threshold corresponding to the intermediate voltage DC, wherein the regulator is to supply the intermediate voltage DC by gating the full wave rectified high voltage DC at the preset voltage threshold; and
   a voltage-reducing switching DC-DC converter directly coupled to the voltage-reducing regulator to receive the intermediate voltage DC provided by the voltage-reducing regulator,
   the voltage-reducing DC-DC converter to step down and smooth out the intermediate voltage DC to a desired high current, low voltage DC output, the voltage-reducing regulator being coupled between the rectifier and the voltage-reducing DC-DC converter to isolate the full wave rectified high voltage DC from the voltage-reducing DC-DC converter, wherein the voltage-reducing regulator comprises a gating component to gate the high voltage DC by turning on at a zero crossing level and turning off when the high voltage DC exceeds the preset voltage threshold and remain off after the high voltage DC exceeds the preset voltage threshold and until a next zero crossing level.

2. The apparatus of claim 1, wherein the rectifier is a bridge rectifier.

3. The apparatus of claim 2, wherein the voltage-reducing regulator is operatively coupled to transistor switches.

4. The apparatus of claim 3, wherein the transistor switches comprise one or more of an enhancement mode MOSFET, a depletion mode MOSFET, a bipolar transistor, a photo transistor, an IGBT, an ESBT, or a silicon controlled rectifier (SCR).

5. The apparatus of claim 1, wherein the high voltage AC line power input to the rectifier is within the range of 60 to 480 voltage AC.

6. The apparatus of claim 1, wherein the high voltage AC line power input to the rectifier is within the range of 80 to 600 voltage AC.

7. The apparatus of claim 1, wherein the preset voltage threshold is 50 volts DC and the desired high current, low voltage DC output is approximately 4 volts DC at 1000 milliamperes (mA).

8. The apparatus of claim 1, wherein components of the voltage reducing DC-DC converter are rated to handle voltage levels up to the preset voltage threshold of the voltage-reducing regulator.

9. The apparatus of claim 1, wherein the voltage-reducing DC-DC converter includes:
   an input capacitor to smooth out the intermediate voltage DC received from the voltage-reducing regulator;
   a switch and a transformer to step down the intermediate voltage DC; and
   an output capacitor to smooth out the stepped down intermediate voltage DC from the transformer to create the desired, high current, low voltage DC output.

10. The apparatus of claim 9, wherein a second output capacitor is coupled to an output of the voltage-reducing DC-DC converter to further smooth the high current, low voltage DC output.

11. The apparatus of claim 1, wherein the intermediate voltage DC is 50 volts DC.

12. The apparatus of claim 1, wherein the rectifier is to provide a high side and a low side for the full wave rectified high voltage DC, and wherein the voltage-reducing voltage regulator is coupled between the rectifier and the DC-DC converter on the high side.

13. An apparatus to convert an input high voltage DC to high current, low voltage DC, comprising:
   a voltage-reducing voltage regulator to receive the input high voltage DC and to provide an intermediate voltage DC capped by a preset voltage threshold corresponding to the intermediate voltage DC, wherein the voltage-reducing regulator is to supply the intermediate voltage DC by gating the input high voltage DC at the preset voltage threshold; and
   a voltage-reducing switching DC-DC converter coupled to the voltage-reducing regulator to receive the intermediate voltage DC output provided by the voltage-reducing regulator, the voltage-reducing DC-DC converter to step down and smooth out the intermediate voltage DC to a desired high current, low voltage DC output,
   the voltage-reducing regulator being coupled directly to the voltage reducing DC-DC converter to isolate the input high voltage DC from the voltage reducing DC-DC converter, wherein the voltage-reducing regulator comprises a gating component to gate the input high voltage DC by turning on at a zero crossing level and turning off when the input high voltage DC exceeds the preset voltage threshold and remain off after the input high voltage DC exceeds the preset voltage threshold and until a next zero crossing level.

14. The apparatus of claim 13, wherein the voltage-reducing regulator is operatively coupled to transistor switches on a high side of the input high voltage DC.

15. The apparatus of claim 14, wherein the transistor switches comprise one or more of an enhancement mode MOSFET, a depletion mode MOSFET, a bipolar transistor, a photo transistor, an IGBT, an ESBT, or a silicon controlled rectifier (SCR).

16. The apparatus of claim 13, wherein the preset voltage threshold is 50 volts DC and the desired high current, low voltage DC output is approximately 4 volts DC at 1000 milliamperes (mA).

17. The apparatus of claim 13, wherein the voltage-reducing DC-DC converter includes:
   an input capacitor to smooth out the intermediate voltage DC received from the voltage-reducing regulator;
   a switch and a transformer to step down the intermediate voltage DC; and
   an output capacitor to smooth out the stepped down intermediate voltage DC from the transformer to create the desired, high current, low voltage DC output.

18. The apparatus of claim 17, wherein a second output capacitor is coupled to an output of the voltage-reducing DC-DC converter to further smooth high current, low voltage DC output.

19. The apparatus of claim 13, wherein components of the voltage reducing DC-DC converter are rated to handle voltage levels up to the preset voltage threshold of the voltage-reducing regulator.

20. The apparatus of claim 13, wherein the input high voltage DC is a full wave rectified high voltage DC.

21. The apparatus of claim 13, wherein the intermediate voltage DC is 50 volts DC.

22. The apparatus of claim 13, wherein the input high voltage DC comprises a high side and a low side, and wherein the voltage-reducing voltage regulator is coupled between the input high voltage DC and the DC-DC converter on the high side.

23. A method to convert alternating current (AC) line power to low voltage direct current (DC) power, comprising:
   rectifying a high voltage AC line power input to provide a full wave rectified high voltage DC;
   coupling the full wave rectified high voltage DC directly to an isolating intermediate voltage regulator;
   continuously regulating the full wave rectified high voltage DC with the isolating intermediate voltage regulator to provide a regulated intermediate voltage DC capped at a preset voltage threshold;
   directly coupling the regulated intermediate voltage DC to a voltage-reducing low voltage DC-DC switching power supply;
   providing a desired, high current, low voltage DC output from the voltage-reducing low voltage DC-DC switching power supply, wherein the isolating intermediate voltage regulator isolates the high voltage AC line power from the voltage-reducing low voltage switching power supply with a regulated intermediate voltage DC; and
   gating the full wave rectified high voltage DC by turning on a switch at a zero crossing level and turning off the switch when the high voltage DC exceeds the preset voltage threshold, thereby outputting a series of intermediate voltage DC waves capped by the preset voltage threshold, and the switch remaining off after the full wave, high voltage DC exceeds the preset voltage threshold and until a next zero crossing level.

24. The method of claim 23, further comprising:
   stepping down the series of intermediate voltage DC waves to a lower voltage DC; and
   smoothing AC ripples in the series of intermediate voltage DC waves prior to stepping down the intermediate voltage DC to the lower voltage DC.

25. The method of claim 23, wherein providing the regulated intermediate voltage DC protects electronic components responsible for stepping down and smoothing AC ripples.

26. The method of claim 25, wherein the components responsible for stepping down and smoothing AC ripples are rated to withstand voltages up to the preset voltage threshold.

27. The method of claim 23, further comprising providing the desired, high current, low voltage DC output to electronic components.

28. The method of claim 23, wherein the full wave rectified high voltage DC comprises a high side and a low side, and wherein continuously regulating the full wave rectified high voltage DC is effected by the isolating voltage-reducing voltage regulating component coupled between the high side of the full wave rectified high voltage DC and the voltage-reducing low voltage switching power supply.

* * * * *